United States Patent [19]
Ouellette et al.

[11] Patent Number: 6,074,505
[45] Date of Patent: *Jun. 13, 2000

[54] STRUCTURE AND METHOD OF FORMING A LAMINATE STRUCTURE

[75] Inventors: William R. Ouellette; Scot G. Wolf, both of Cincinnati, Ohio

[73] Assignee: The Procter & Gamble Company, Cincinnati, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/680,472

[22] Filed: Jul. 15, 1996

[51] Int. Cl.⁷ .................................................. D03D 13/00
[52] U.S. Cl. .................. 156/148; 156/308.2; 156/309.6; 156/309.9; 428/198; 428/442.5; 428/442.2
[58] Field of Search ................................. 428/198, 442.5, 428/442.2; 156/308.2, 309.6, 309.9, 148

[56] References Cited

U.S. PATENT DOCUMENTS

| | | | |
|---|---|---|---|
| 3,575,782 | 4/1971 | Hansen | 161/141 |
| 4,062,995 | 12/1977 | Korpman | 428/134 |
| 4,333,782 | 6/1982 | Pieniak | 156/164 |
| 4,414,970 | 11/1983 | Berry | 128/156 |
| 4,522,863 | 6/1985 | Keck et al. | 428/196 |
| 4,525,407 | 6/1985 | Ness | 428/138 |
| 4,573,991 | 3/1986 | Pieniak et al. | 604/385 A |
| 4,606,964 | 8/1986 | Wideman | 428/152 |
| 4,652,487 | 3/1987 | Morman | 428/138 |
| 4,661,389 | 4/1987 | Mudge et al. | |
| 4,704,172 | 11/1987 | Katz | 156/73.2 |
| 4,720,415 | 1/1988 | Vander Wielen et al. | 428/152 |
| 4,725,476 | 2/1988 | Mussallem, III | 428/167 |
| 4,789,699 | 12/1988 | Kieffer et al. | 524/271 |
| 4,841,958 | 6/1989 | Ersfeld et al. | 128/90 |
| 4,856,502 | 8/1989 | Ersfeld et al. | 128/90 |
| 4,957,795 | 9/1990 | Riedel | 428/74 |
| 4,977,011 | 12/1990 | Smith | 428/152 |
| 4,984,584 | 1/1991 | Hansen et al. | 128/898 |
| 5,151,092 | 9/1992 | Buell et al. | 750/775 |
| 5,156,793 | 10/1992 | Buell et al. | 264/288.8 |
| 5,167,897 | 12/1992 | Weber et al. | 264/288.8 |
| 5,187,005 | 2/1993 | Stahle et al. | 428/252 |
| 5,209,801 | 5/1993 | Smith | 156/161 |
| 5,230,701 | 7/1993 | Meyer et al. | 602/76 |
| 5,334,446 | 8/1994 | Quantrille et al. | 428/284 |
| 5,352,497 | 10/1994 | Patel | 428/34.1 |
| 5,393,599 | 2/1995 | Quantrille et al. | 428/284 |
| 5,470,639 | 11/1995 | Gessner et al. | 428/152 |
| 5,503,908 | 4/1996 | Faass | 428/198 |

FOREIGN PATENT DOCUMENTS

93/16870  9/1993  WIPO .

Primary Examiner—Johann Richter
Assistant Examiner—Taofq A. Solola
Attorney, Agent, or Firm—Loy M. White; Betty J. Zea; T. David Reed

[57] ABSTRACT

An elastic laminate structure is provided which is formed from at least one fabric layer and an open cell mesh having first and second strands. The laminate structure is formed such that the first strands are integrally bonded to the first fabric layer. The integrally bonded first strands both penetrate the first fabric layer and bond mechanically and/or chemically to the fibers of the first fabric layer. In addition, the first strands are deformed such that they are substantially flat in shape and substantially coplanar with the fabric layer. The elastic second strands have a substantially elliptical shape. The integral bonding of the first strands and the deformed shape of the first strands and the second strands provides an elastic laminate structure which can be worn about the body without irritation or other discomfort.

22 Claims, 3 Drawing Sheets

STRUCTURE AND METHOD OF FORMING A LAMINATE STRUCTURE

FIELD OF THE INVENTION

This invention relates generally to the field of laminate structures and, more particularly, to elastic laminate structures formed from a polymeric mesh and at least one fabric layer, wherein improved elasticity can be provided without sacrificing comfort.

BACKGROUND OF THE INVENTION

Laminate structures have previously been used in a variety of products including elastic absorbent structures such as sweat bands, bandages, diapers, incontinence devices. Several methods for producing these laminate structures also currently exist. For example, U.S. Pat. No. 4,606,964 to Wideman teaches the joining of a gatherable material to each side of a tensioned elastic web. The gatherable materials are joined in a pre-tensioned state to the elastic web by self-adhering compounds, adhesives or thermal bonding. When the tension in the elastic web is released after joining, the web contracts thereby collecting the gatherable material into folds.

U.S. Pat. No. 4,522,863 to Keck et al. discloses a laminate structure comprising a mesh having a tissue layer attached to one side and a layer of microfibers attached to the other. The tissue and microfiber layers are attached to the mesh by adhesive, and portions of the layers remain unbonded to the mesh to provide a soft, clothlike feel and appearance.

U.S. Pat. No. 4,977,011 to Smith teaches a laminate structure having outer layers of low-basis weight breathable material, a central elastic layer, and an adhesive layer that serves to join all the layers together. The elastic layer can be formed from either a single elastic strand laid between pins to form a multiplicity of nonintersecting lines of elastic, or, alternatively, by a plurality of elastic strands intersecting at right angles and adhesively joined to the low basis weight breathable material.

Although the above-described laminate structures may be suitable for the purposes for which they were intended, it is desirable to provide an improved laminate structure having additional benefits and features. For example, the previously described structures provide strands which extend in two distinct directions across the structure (or, alternatively, teach a complex method for aligning a single strand in a single direction between pins). When resulting laminate structures such as these are cut, however, the cut edges of the strands can protrude on cut sides of the structure such that they can be a source of irritation if the structure is worn next to the body, as is the case with bandages, body wraps, diapers, incontinence devices and the like. Further, if an elastic laminate structure having a large modulus value (i.e., the ratio of stress to strain) is desired, elastic strands having a large cross-sectional area are generally required. However, large strands of this type can produce a rough or "nubby" feeling when placed in contact with the body. Consequently, it would be desirable to further provide an elastic laminate structure which can provide elastic strands having large cross-sectional areas and yet which is still comfortable to be worn about the body. The present invention provides an improved laminate structure and method for forming such structure which can accommodate designs having the above-described structural features and benefits.

SUMMARY OF THE INVENTION

A laminate structure is provided comprising first fabric layer and a mesh having a plurality of first strands which intersect a plurality of second strands. The first and second strands intersect at a predetermined and substantially uniform angle which preferably is about 90 degrees. Although the first and second strands can be elastic, inelastic, or a combination thereof, it is preferred that the first strands are inelastic while the second strands are elastic. Such a configuration provides a laminate structure which is inelastic along the direction of the first strands and elastic along the direction of the second strands.

The first and second strands have a softening temperature at a bonding pressure such that application of the bonding pressure at the softening temperature of the first strands integrally bonds at least one of the first strands to the first fabric layer. Further, it is desirable that application of the bonding pressure deforms at least one of the first strands into a substantially flat shape which is also coplanar with the inner surface of the first fabric layer. For ease of manufacture and processing, the softening temperatures of the first and second strands are preferably distinct at the bonding pressure, the softening temperature of the first strands being lower than the softening temperature of the second strands. So as to avoid overlap or joining of adjacent first strands when the first strands are deformed by application of the bonding pressure, the first strands preferably have a strand density of between about 2 and about 10 first strands per centimeter and a cross-sectional area of between about 0.0005 $cm^2$ and about 0.03 $cm^2$.

The laminate structure of the present invention can be formed by either a static plate process or a roller nip process. In the static plate process, a first surface is provided in the form of a substantially resilient plate while a second surface is provided in the form of a substantially non-resilient plate. The mesh and fabric are juxtaposed and the bonding pressure is applied to the first strands of the mesh by appropriately moving the first surface toward the second surface. Because the first surface is heated to a temperature such that the first strands are at their softening temperature for the applied bonding pressure, the first strands integrally bond to the first fabric layer. Preferably, the application of the bonding pressure also deforms the first strands into a substantially flat shape which is also coplanar with the first fabric layer and deforms the second strands into a substantially elliptical shape.

In the nip process, three surfaces in the form of rollers are provided wherein a substantially resilient first surface is in surface contact with a substantially non-resilient second surface (i.e., forming an interference nip) and the second surface is adjacent a substantially non-resilient third surface such that a gap is formed therebetween (i.e., forming a gapped nip). The first fabric layer and mesh are juxtaposed and fed over the third surface which is heated to a temperature such that the second strands reach their softening temperature for the deformation pressure which is applied at the gap. Application of the deformation pressure to the second strands at the gap preferably deforms the second strands into a substantially elliptical shape. The juxtaposed fabric and mesh are then fed over the second surface which is heated to a temperature such that the first strands reach their softening temperature with respect to the bonding pressure which is applied at the interference nip between the first and second surfaces. Application of the bonding pressure to the first strands at their softening temperature integrally bonds the first strands to the first fabric layer. Preferably, application of the bonding pressure also deforms the first strands into a substantially flat shape which is also coplanar with the inner surface of the first fabric layer. The substantially flat shape, integral bonding of the first strands to the first fabric layer, and the substantially elliptical shape of the second strands advantageously provides a laminate structure which can be worn about the body (e.g., in bandages, body wraps and the like) without irritation or other discomfort.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

DETAILED DESCRIPTION OF THE PREFERRED EMBODIMENTS

Figure 1:
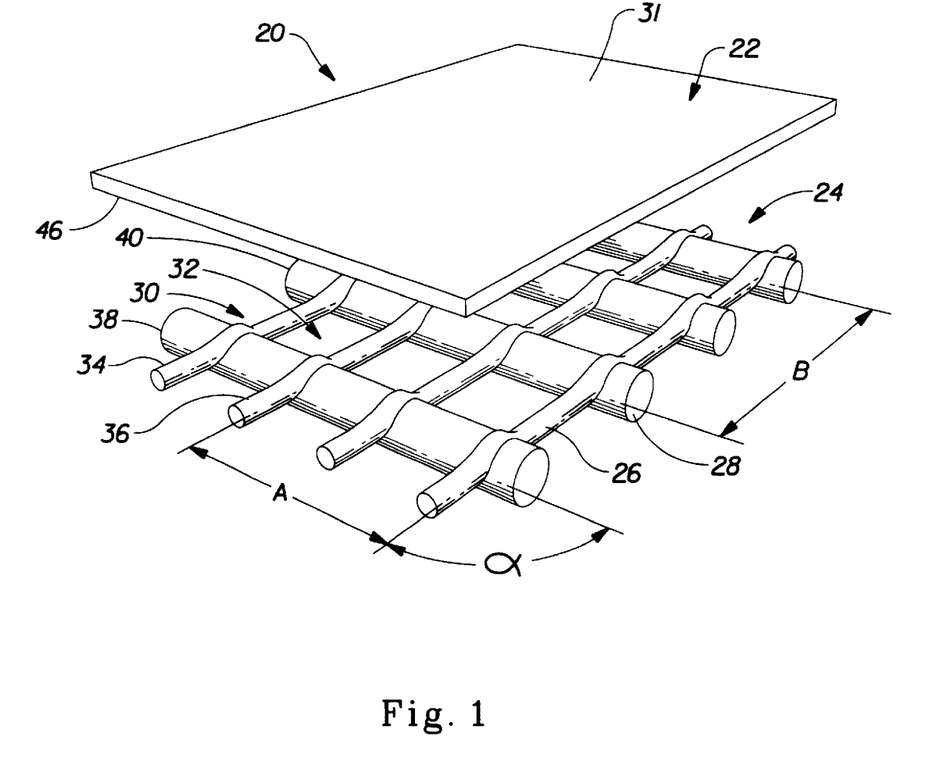
FIG. 1 is an exploded view of a mesh and first fabric layer prior to being formed into a laminate structure made in accordance with the present invention.
Figure 2:
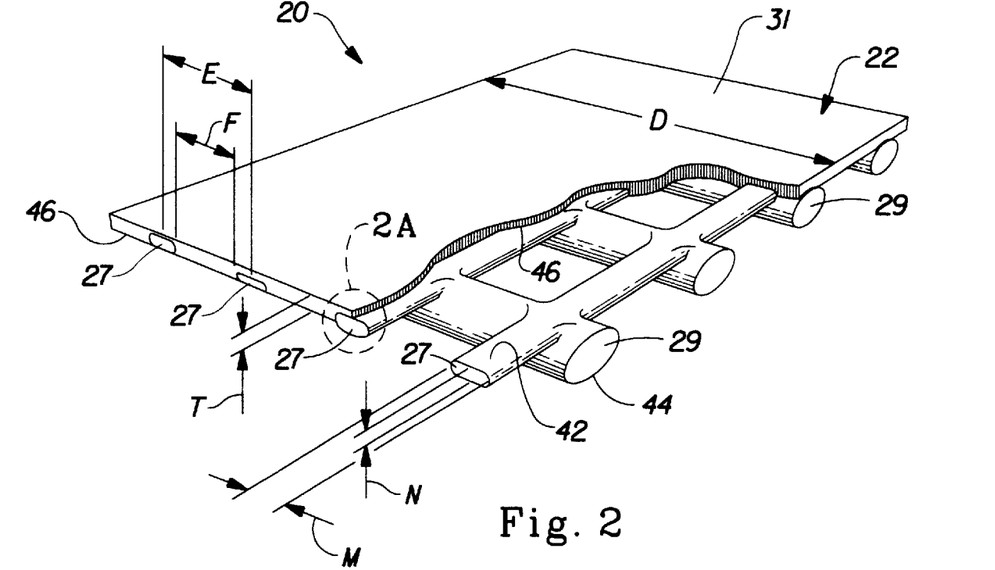
FIG. 2 is a partial perspective view of a laminate structure made in accordance with the present invention, wherein a portion of the fabric layer has been removed to show the integrally bonded first strands.

Reference will now be made in detail to the present preferred embodiments of the invention, examples of which are illustrated in the accompanying drawings wherein like numerals indicate the same elements throughout the views. FIG. 1 is an exploded view of the components of laminate structure 20 prior to its formation (laminate structure 20 is shown in FIG. 2). As illustrated, laminate structure 20 is formed from a first fabric layer 22 and an open cell mesh 24 having a plurality of first strands 26 and a plurality of second strands 28. As shown in FIG. 2, laminate structure 20 preferably has at least one structural direction D, wherein at least a portion of structural direction D is elastic. More preferably, laminate structure 20 provides a structural direction D which is elastic along the direction and entire length of second strands 28. As used herein, the phrase "structural direction" (e.g., D) is intended to mean a direction which extends substantially along and parallel to the plane of outer fabric surface 31 of first fabric layer 22. Laminate structure 20 can be incorporated into a variety of products (not illustrated) wherein it is desired to provide at least one structural direction which is partially or entirely elastic along its length. Examples of such products include elastic diapers, incontinence products, bandages, body wraps and the like.

Although it is preferred that laminate structure 20 provide at least one structural direction D which is elastic, it is further contemplated that laminate structure 20 can be inelastic such that no elastic structural directions are provided. Alternatively, laminate structure 20 can also be provided with a structural direction over which a portion of the length thereof is elastic and a portion of the length thereof is inelastic. As used herein, the term "elastic" is intended to mean a directional property wherein an element or structure has a recovery to within about 10 percent of its original length $L_o$ in the subject direction after being subjected to a percentage strain $\epsilon\%$ of greater than 50 percent. As used herein, percentage strain $\epsilon\%$ is defined as:

$$\epsilon_\% = [(L_f - L_o)/L_o]*100$$

Where $L_f$ = Elongated length $L_o$ = Original length

For consistency and comparison, the recovery of an element or structure is preferably measured 30 seconds after release from its elongated length $L_f$. All other elements or structures will be considered inelastic if the element or structure does not recover to within about 10 percent of its original length $L_o$ within 30 seconds after being released from a percentage strain $\epsilon\%$ of 50%. Inelastic elements or structures would also include elements or structures which partially or wholly separate, fracture and/or permanently/plastically deform when subjected to a percentage strain $\epsilon\%$ of 50%.

Referring now to FIG. 1, mesh 24 comprises a plurality of first strands 26 which intersect or cross (with or without bonding to) a plurality of second strands 28 at nodes 30 at a predetermined angle α, thereby forming a net-like open structure having a plurality of apertures 32. Each aperture 32 is defined by at least two adjacent first strands (e.g., 34 and 36) and at least two adjacent second strands (e.g., 38 and 40) such that apertures 32 are substantially rectangular (preferably square) in shape. Other aperture configurations, such as parallelograms or circular arc segments, can also be provided. Such configurations could be useful for providing non-linear elastic structural directions. It is preferred that first strands 26 are substantially straight and substantially parallel to one another, and, more preferably, that second strands 28 are also substantially straight and substantially parallel to one another. Most preferably, first strands 26 intersect second strands 28 at nodes 30 at a predetermined angle α of about 90 degrees. Each node 30 is an overlaid node, wherein first strands 26 and second strands 28 are preferably joined or bonded (although it is contemplated that joining or bonding may not be required) at the point of intersection with the strands still individually distinguishable at the node however. However, it is believed that other node configurations such as merged or a combination of merged and overlaid would be equally suitable.

Although it is preferred that first and second strands be substantially straight, parallel, and intersect at an angle α of about 90 degrees, it is noted that first and second strands can intersect at other angles α, and that first strands 26 and/or second strands 28 can be aligned in circular, elliptical or otherwise nonlinear patterns relative to one another. Although for ease of manufacture it is contemplated that first strands 26 and second strands 28 have a substantially circular cross-sectional shape prior to incorporation into laminate structure 20 (as shown in FIG. 1), first and second strands can also have other cross-sectional shapes such as elliptical, square, triangular or combinations thereof.

The process of manufacturing mesh 24 for incorporation into the present invention involves the selection of an appropriate material for the first and second strands. Preferably, the material of first strands 26 is chosen so that first strands 26 can maintain second strands 28 in relative alignment prior to forming laminate structure 20. It is also desirable that the materials of first and second strands be capable of being deformed (or initially formed) into predetermined shapes upon application of a predetermined pressure or a pressure in combination with a heat flux, as described in more detail hereafter. These deformed shapes (e.g., elliptical second strands, substantially flat first strands and the like) provide a laminate structure 20 which can be comfortably worn about the body without irritation or other discomfort. It is further desirable that the material chosen for first strands 26 provide an adhesive-like property for joining a portion of second strand outer surface 44 of deformed second strands 29 to a portion of first fabric layer inner surface 46.

Figure 2A:
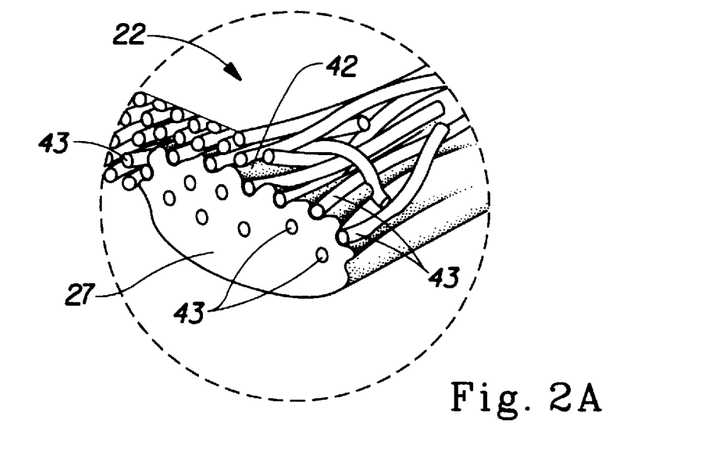
FIG. 2a is an enlarged partial perspective view of an integrally bonded first strand of the laminate structure of FIG. 2.

The material of first strands 26 should also be capable of integrally bonding with first fabric layer 22 as part of forming laminate structure 20. As described in more detail hereafter, first strands 26 can be integrally bonded to first fabric layer 22 by application of a pressure or a pressure in combination with a heat flux. As used herein, the phrase "integrally bonded" and its derivatives is intended to mean that a portion of a strand outer surface (e.g., first strand outer surface 42) of an integrally bonded strand (e.g., integrally bonded first strands 27) has penetrated into and bonded with first fabric layer 22. The portion of the strand outer surface of an integrally bonded strand which penetrates first fabric layer 22 can bond mechanically (e.g., as by encapsulating, encircling or otherwise engulfing) and/or chemically (e.g., polymerizing, fusing or otherwise chemically reacting) with fibers 43 of first fabric layer 22, as shown in FIG. 2a. With regard to penetration, integrally bonded preferably means that a portion of the strand outer surface has penetrated at least about 10% of fabric structural thickness T of first fabric layer 22 in laminate structure 20, and, more preferably, a portion of the strand outer surface has penetrated at least about 25 percent of fabric structural thickness T (various amounts of penetration are generally shown in FIG. 2). Most preferably, a portion of the strand outer surface has penetrated about 100% of fabric structural thickness T. Further, because integrally bonded strands enhance the comfort of laminate structure 20 when worn about the body, it is preferred that between about 10 percent and about 50 percent of first strands 26 are integrally bonded to first fabric layer 22 of laminate structure 20. More preferably, between about 50 percent and about 90 percent of first strands 26 are integrally bonded to first fabric layer 22. Most preferably, about 100 percent of first strands 26 are integrally bonded.

The above-described benefits can be achieved by selecting a first strand material having a softening temperature which is lower than the softening temperature of second strands 28 relative to the processing pressures used to form laminate structure 20. As used herein, the phrase "softening temperature" is intended to mean the temperature at which a material flows or deforms under an applied pressure. Typically, heat is applied to a material to achieve a softening temperature. This generally results in a decrease in the viscosity of the material which may or may not involve a "melting" of the material, the melting being associated with a latent heat of fusion. Thermoplastic materials tend to exhibit a lowering in viscosity as a result of an increase in temperature allowing them to flow when subjected to an applied pressure. It will be understood that as the applied pressure increases, the softening temperature of a material decreases and therefore a given material can have a plurality of softening temperatures because the temperature will vary with the applied pressure. For ease of manufacturing and processing, and when utilizing generally polymeric materials for strands 26 and 28, it is desirable that the difference in softening temperatures between the material of first strands 26 and the material of second strands 28 is at least about 10 degrees centigrade, when both materials are subjected to the same applied pressure (e.g., the processing pressure). More preferably, the difference in softening temperatures between the first and second strands is at least about 20 degrees centigrade. As will be understood, the difference in softening temperatures between the materials of first strands 26 and second strands 28 facilitates the integral bonding of first strands 26 to first fabric layer 22 without integrally bonding second strands 28 to the first fabric layer when both strands are subjected to a predetermined pressure or predetermined pressure and heat flux. In addition to the selection of first and second strand materials for softening point, second strands 28 are preferably formed from a material which renders second strands 28 appropriately elastic such that laminate structure 20 provides a structural direction along the direction of second strands 28 which is also appropriately elastic as desired.

Polymers such as polyolefins, polyamides, polyesters, and rubbers (e.g., styrene butadiene rubber, polybutadiene rubber, polychloroprene rubber, nitrile rubber and the like) have been found to be suitable materials for forming the first and second strands of mesh 24. Other materials or compounds (e.g., adhesive first strands) having different relative softening temperatures or elasticities can be substituted so long as the material provides the previously described benefits. Additionally, adjunct materials can be added to the base materials comprising first and second strands (e.g., mixtures of pigments, dyes, brighteners, heavy waxes and the like) to provide other desirable visual, structural or functional characteristics. Mesh 24 may be formed from one of a variety of processes known in the art.

So that mesh 24 can be integrally bonded to first fabric layer 22, it is desirable that first fabric layer 22 have a basis weight of less than about 100 gm/m$^2$, a caliper of less than about 0.1 cm, and comprise fibers having a fiber size of less than about 20 denier per filament. More preferably, for products such as body wraps, bandages and the like, first fabric layer will have a basis weight of less than about 50 gm/m$^2$, a fiber size of less than about 5 denier per filament and a caliper of less than about 0.02 cm. For ease of manufacture and cost efficiency, first fabric layer 22 is preferably formed from a non-woven fabric having fibers formed, for example, from polyethylene, polypropylene, polyethylene terepthalate, nylon, rayon, cotton or wool. These fibers can be joined together by adhesives, thermal bonding, needling/felting, or other methods known in the art to form first fabric layer 22. Although it is preferable that first fabric layer 22 is formed from a non-woven fabric, other fabrics such as woven, three dimensional formed films, and two dimensional apertured flat films would be equally suitable.

The softening temperature of first fabric layer 22 (at the subject processing pressures) should be greater than any of the processing temperatures applied to mesh 24 in forming laminate structure 20. In addition, first fabric layer 22 of the present invention preferably has a modulus of less than about 100 gm force per cm at a unit strain $\epsilon_u$ of at least about 1 (i.e., $L_f = 2 \times L_o$) in a direction along second strands 28 when it is formed into laminate structure 20. As used herein, the term "modulus" is intended to mean the ratio of an applied stress $\sigma$ to the resulting unit strain $\epsilon_u$, wherein stress $\sigma$ and unit strain $\epsilon_u$ are:

$\sigma = F/W$
$\epsilon_u = (L_f - L_O)/L_O$
Where
    F = Applied Force
    W = Orthogonal dimension of the -continued element or structure subjected to the
applied force F (typically the structure
width)
$L_f$ = Elongated length
$L_O$ = Original length For example, a 20 gram force applied orthogonally across a 5 cm wide fabric would have a stress σ of 4 grams force per cm. Further, if the original length $L_o$ in the same direction as the applied force F were 4 cm and the resulting elongated length $L_f$ were 12 cm, the resulting unit strain $\epsilon_u$ would be 2 and the modulus would be 2 grams force per cm.

It is believed that a first fabric layer having a modulus of less than about 100 grams force per cm in a subject fabric direction will, when the subject fabric direction is juxtaposed co-directional with elastic second strands 28 in laminate structure 20, provide a laminate structure 20 with a modulus along the direction of second strands 28 that is largely a function of the material properties, size and arrangement of second strands 28. In other words, the modulus of first fabric layer 22 will be low enough that the modulus of the second strands will largely determine the modulus of laminate structure 20 in the subject direction. This configuration is especially useful if it is desired that laminate structure 20 provide an elastic structural direction along the direction of laminate second strands 29.

If first fabric layer 22 does not inherently provide the desired modulus, first fabric layer can be subjected to an activation process before or after forming laminate structure 20. As taught for instance in U.S. Pat. No. 4,834,741 issued to Sabee on May 30, 1989, the substance of which is hereby incorporated by reference, subjecting first fabric layer 22 to an activation process (either separately or as part of laminate structure 20) will plastically deform first fabric layer 22 such that it will provide the desired modulus. In an activation process, such as that taught by Sabee, a first fabric layer 22 (or laminate structure incorporating same) is passed between corrugated rolls to impart extensibility thereto by laterally stretching first fabric layer 22 in the cross-machine direction. First fabric layer 22 is incrementally stretched and drawn to impart a permanent elongation and fabric fiber orientation in the cross-machine direction. This process can be used to stretch first fabric layer 22 (or multiple fabric layers) before or after joinder to the laminate structure 20. This preferably provides a laminate structure 20 which can be extended in an elastic structural direction with minimal force as fabric layer 22 (and any additional fabric layers) have initially been "activated" or separated in this direction, thereby providing a low modulus in the subject direction such that the laminate structure modulus is primarily a function of laminate second strands 29.

Laminate structure 20 is preferably formed by juxtaposing first fabric layer 22 and mesh 24 and applying a predetermined pressure or a predetermined pressure and heat flux, depending upon the selected mesh and fabric materials, so that first strands 26 are integrally bonded to first fabric layer 22. In addition to integrally bonding first strands 26 to first fabric layer 22, it is desirable that the above-described process deform first strands 26 so that the shape of integrally bonded first strand outer surface 42 is substantially flat. The phrase "substantially flat" and its derivatives, as used herein, means that integrally bonded first strands 27 have a major dimension M (i.e., the largest dimension parallel to the major axis of the strand cross section as shown in FIG. 2) at least about 2 times the length of a minor dimension N (i.e., the smallest dimension parallel to the minor axis of the strand cross section as shown in FIG. 2). Thus, it should be clear that an integrally bonded first strand 27 can have irregularities in outer surface 42 (i.e, peaks and valleys and the like, as shown in FIG. 2a) and still be within the intended meaning of substantially flat. More preferably, it is desirable that a portion of outer surface 42 of integrally bonded first strands 27 is also substantially coplanar with first fabric layer inner surface 46 such that minor dimension N is about equal to or less than structural thickness T of first fabric layer 22 and substantially all of minor dimension N is located within structural thickness T, as generally shown in FIG. 2. It is further contemplated that variations in the substantially flat and coplanar shapes of integrally bonded first strands 27 can occur along the length of first strands 27 without deviating from scope of these definitions. In other words, due to processing variations, it is noted that portions of integrally bonded first strands 27 can be substantially flat and/or coplanar while other portions along the same strand may not. These configurations are still considered to be within the definitions of substantially flat and coplanar as set forth above.

The above-described shapes of integrally bonded first strands 27 advantageously provide a laminate structure 20 wherein strands 27 do not protrude in a manner which would cause irritation or other discomfort when laminate structure 20 is cut (thereby exposing the ends of integrally bonded first strands 27) and worn about the body. As such, it is preferred that at least about 50 percent of integrally bonded first strands 27 are substantially flat and coplanar, and, more preferably, at least about 75 percent of integrally bonded first strands 27 are substantially flat and coplanar. Most preferably, about 100% of integrally bonded first strands 27 are substantially flat and coplanar.

In contrast to the substantially flat and coplanar shape of integrally bonded first strands 27 of laminate structure 20, laminate second strands 29 are preferably only joined (as opposed to integrally bonded) to first fabric inner surface 46, as shown in FIG. 2, by application of the above-described pressure and heat flux. It is contemplated, however, that second strands 29 can also be integrally bonded to first fabric layer 22 if so desired. The integral bonding of first strands 26 to first fabric layer 22 can also be performed such that first strands 26 act as an adhesive to intermittently join second strands 28 to first fabric inner surface 46 at nodes 30. Alternatively, second strands 28 can comprise a self-adhering material which aids in joining a portion of second strand outer surfaces 44 to first fabric layer inner surface 46.

Figure 3:
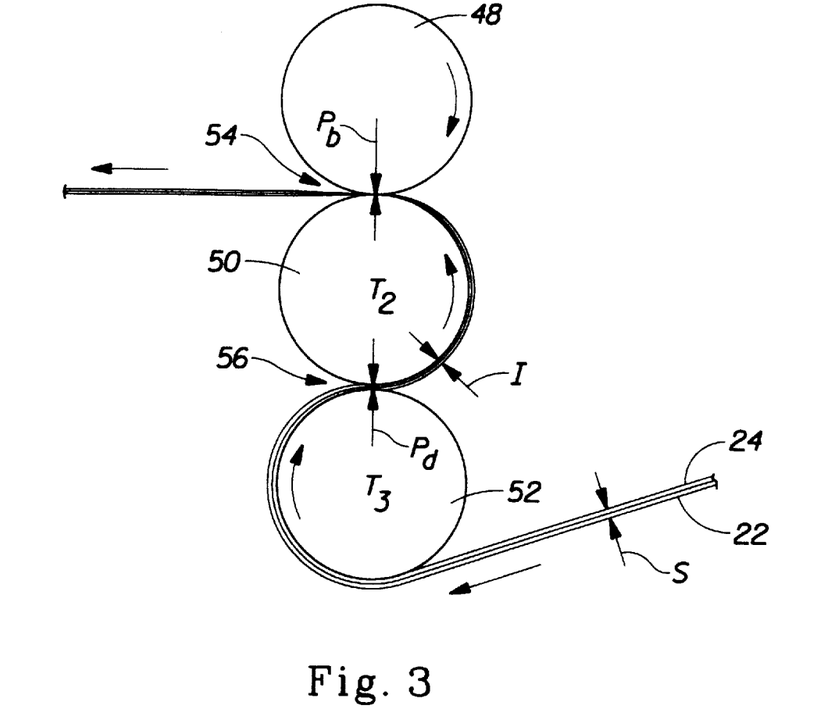
FIG. 3 is a schematic representation of a gapped nip process according to the present invention for forming the laminate structure of FIG. 2.

As seen in FIG. 3, laminate structure 20 is preferably manufactured by a gapped nip process comprising a substantially resilient first surface 48 (e.g., formed from a silicone or other deformable rubber), a substantially non-resilient second surface 50 (e.g., formed from steel or the like), and a substantially non-resilient third surface 52, wherein these surfaces are provided in the form of rollers. First and second surfaces are positioned in surface contact to one another thereby forming an interference nip 54 while second surface 50 is spaced adjacent to third surface 52 such that a nip 56 having a gap is formed therebetween. The gap is preferably sized such that the smaller diameter first strands 26 pass easily therethrough while larger diameter second strands 28 are contacted by second surface 50 and third surface 52. Preferably, the rollers comprising first, second, and third surfaces are in relative vertical alignment, as illustrated generally in FIG. 3.

First fabric layer 22 is juxtaposed adjacent to mesh 24 such that when fed around third surface 52, as seen in FIG.

3, mesh 24 is preferably adjacent to third surface 52 and disposed between the third surface and first fabric layer. Third surface 52 is heated to a temperature T3 which, in combination with the feed rate of juxtaposed first fabric layer 22 and mesh 24 over third surface 52, raises the temperature of second strands 28 to their softening temperature relative to the deformation pressure $P_d$ exerted at gapped nip 56 upon second strands 28. Because first strands 26 are preferably exposed to pressure much less than deformation pressure $P_d$ because of their small diameter, first strands 26 preferably have not reached their softening temperature because of this low applied pressure at this nip and therefore undergo little if any deformation thereat. In contrast, second strands 28 are deformed into a substantially elliptical shape at gapped nip 56 because deformation pressure $P_d$ is fully applied such that second strands 28 have reached their softening temperature at this applied pressure. It should be readily apparent that even though the first and second strands may be at about the same physical temperature at gapped nip 56, second strands 28 are at their softening temperature while first strands 26 are not because each are exposed to a different applied pressure. The elliptical cross-sectional shape of second strands 29 is desirable if the undeformed cross section of the second strands would otherwise produce a "hubby" or rough feel when laminate structure 20 is worn about the body. Preferably, the post-nip structural thickness I of juxtaposed first fabric layer 22 and mesh 24 is about 50% of the pre-nip structural thickness S.

As juxtaposed first fabric layer 22 and mesh 24 pass through gapped nip 56, first fabric layer 22 is preferably oriented adjacent second surface 50 and disposed between second surface 50 and mesh 24. Second surface 50 is preferably heated to a temperature T2 which, in combination with the feed rate of juxtaposed first fabric layer 22 and mesh 24 over second surface 50, raises the temperature of first strands 26 to their softening temperature relative to the bonding pressure $P_b$ exerted at interference nip 54. The bonding pressure $P_b$ is preferably low enough that second strands 28 preferably have not reached their softening temperature at interference nip 54 and therefore undergo little additional deformation thereat. In contrast, as juxtaposed first fabric layer 22 and mesh 24 pass through interference nip 54, first strands 26 are integrally bonded to first fabric layer 22 by the application of bonding pressure $P_b$ from the first and second surfaces at the nip because first strands 26 have reached their softening temperature, relative to applied bonding pressure $P_b$, from the heat flux provided by temperature T2. Resilient first surface 48 provides a bonding pressure $P_b$ that is uniformly applied to first strands 26 between second strands 28 due to the conforming nature of resilient first surface 48. More preferably, the application of pressure $P_b$ and heat flux from second surface 50 at temperature T2 is sufficient to also deform first strands 26 into substantially flat shaped and integrally bonded first strands 27. Most preferably, the application of pressure and heat flux is sufficient to also deform first strands 26 into integrally bonded first strands 27 which are substantially coplanar with first fabric inner surface 46.

The feed rate of juxtaposed first fabric layer 22 and mesh 24 through first, second and third surfaces can be adjusted so that first and second strands have a sufficient residence time adjacent heated second and third surfaces so that these strands can be softened and deformed as described herein. It has been found, however, that a smaller gapped nip 56 is required as this feed rate is increased to maintain the same relative pressure and hence deformation of second strands 29.

Based upon the foregoing described nip process, it has been found that the following will form a satisfactory laminate structure 20 having an elastic structural direction along the direction of laminate second strands 29: a carded non-woven first fabric layer 22 formed from thermally bonded polypropylene and having a 32 gram per $m^2$ basis weight, a fiber size of about 2.2 denier per filament, a caliper of between about 0.01 cm to about 0.03 cm, a modulus of about 100 grams force per cm at a unit strain $\epsilon_u$ of 1 (such a fabric being marketed by Fibertech, of Landisville, N.J., under the name of PHOBIC Q-1); and a mesh 24 comprising first strands 26 formed from polyethelylene and second strands 28 formed from a styrene or butadiene block copolymer (such a mesh being manufactured by Conwed of Minneapolis, Minn. and marketed under the name T50018). Specifically, the juxtaposed PHOBIC Q-1 fabric and T50018 mesh having a pre-formed structural thickness S of about 0.12 cm are fed at a rate of between about 5 and about 15 meters per minute over third surface 52 which is heated to a temperature T3 of about 90 degrees centigrade. In a preferred arrangement, the juxtaposed fabric and mesh pass through nip 56 having a gap of between about 0.01 and about 0.02 cm such that they emerge from the nip having an intermediate structural thickness I of about 0.056 cm. Preferably, second surface 50 is heated to a temperature T2 of about 135 degrees centigrade as the juxtaposed fabric and mesh pass over second surface 50 and through inference gap 54.

Figure 4:
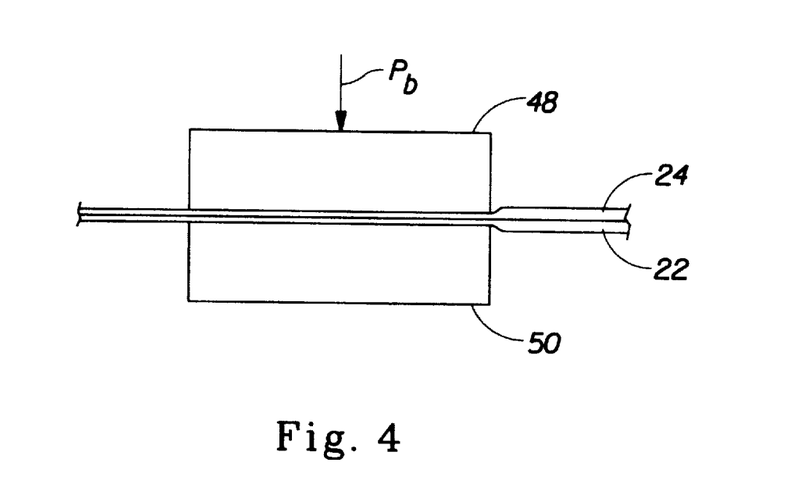
FIG. 4 is a schematic representation of a plate process according to the present invention for forming the laminate structure of FIG. 2.

In addition to forming a laminate structure of the present invention via the above-described dual nip process, such laminate structure can also be formed by a process providing a first surface (e.g., 48) and a second surface (e.g., 50) in the form of corresponding plates, such as shown in FIG. 4. As discussed previously, first surface 48 preferably is substantially resilient, while second surface 50 is substantially non-resilient. First fabric layer 22 is juxtaposed with mesh 24 such that first fabric layer 22 is immediately adjacent second surface 50. First surface 48 is preferably heated to a temperature T1 and a bonding pressure $P_b$ is applied to the juxtaposed fabric and mesh by moving first surface 48 toward second plate surface 50 appropriately. Because temperature T1 heats first strands 26 to their softening temperature for the applied bonding pressure $P_b$, application of the bonding pressure $P_b$ integrally bonds first strands 26 to the first fabric layer 22. More preferably, application of the bonding pressure $P_b$ also deforms first strands 26 into a substantially flat shape which is also coplanar with inner surface 46 of the first fabric layer. Most preferably, application of bonding pressure $P_b$ also deforms the second strands into a substantially elliptical shape.

Using the PHOBIC Q-1 fabric and T50018 mesh combination described above, a satisfactory laminate structure 20 having first strands 26 integrally bonded to first fabric layer 22 can be provided if first surface 48 is heated to a temperature T1 of about 120 degrees centigrade, and a bonding pressure $P_b$ of between 350 to 700 grams force per $cm^2$ is applied for between about 10 and about 20 seconds.

It is believed that properly selecting the strand density, strand cross-sectional area, and/or the melt index of first strands 26 (if first strands 26 are formed of a polymer) is necessary in order to provide a laminate structure 20 having an elastic structural direction along the direction of the second strands 28. Improper selection of strand density, strand cross-sectional area, and/or melt index of first strands 26 can result in a laminate structure wherein portions of integrally bonded first strands 27 can overlap or merge together in laminate structure 20. Such merging or overlap of integrally bonded first strands 27 can result in only small portions of laminate second strands 29 being able to extend or elongate when subjected to a tensile force, as opposed to the elongation being distributed along substantially the entire length of substantially all of laminate second strands 29 absent this overlap. To minimize this condition, the strand density, strand cross-sectional area, and/or melt index of first strands 26 should be selected such that integrally bonded first strands 27 have a strand coverage S of less than about 50%. As used herein, the phrase "strand coverage" is intended to be a measure of the amount of surface area of first fabric layer inner surface 46 which is in contact with integrally bonded first strands 27 of the present invention. Strand coverage $S_c$ is defined as:

$$S_c = (E-F)/E * 100$$

Where E=strand centerline distance between any adjacent integrally bonded first strands 27, as shown in FIG. 2

F=strand edge distance F between any adjacent integrally bonded first strands 27, as shown in FIG. 2

The measurements of E and F can be taken at any cross section through laminate structure 20 of the present invention between any adjacent integrally bonded first strands 27.

The phrase "strand density", as used herein, is intended to mean the number of subject strands per centimeter along a strand transverse to the subject strands. For example, first strands 26 have a strand density which can be measured over a predetermined length A of a second strand 28, as shown in FIG. 1. Likewise, second strands 28 have a strand density which can be measured over a predetermined length B of a first strand 26. The phrase "strand cross-sectional area" as used herein, is intended to mean the cross-sectional area of any first strand 26 of mesh 24 when measured according techniques known in the art. For example, the selected strand can be encapsulated in a resin, sliced, and the cross-sectional area measured by means of an magnifying instrument, such as a light microscope or scanning electron microscope.

The melt index of a polymer measures the ability of the polymer to flow when subjected to a given temperature and pressure. A polymer having a low melt index will be more viscous (and therefore not flow as readily) at a given temperature than a polymer having a higher melt index. Thus, it is believed that first strands 26 comprising a polymer having a high melt index will have a greater tendency to merge or overlap during application of a given pressure and heat flux than first strands 26 comprising a polymer having a lower melt index and subjected to the same pressure and heat flux. Because of this variability, the polymer forming first strands 26 can be selectively chosen, in conjunction with the strand density and strand cross-sectional area, to provide a predetermined melt index such that first strands 26 are integrally bonded to first fabric layer 22 with a strand coverage $S_c$ of about 50 percent. In addition, varying the polymer melt index can also be especially useful where it is desired to increase the density of the first fabric layer 22 while maintaining the same processing conditions. In this situation, the polymer of first strands 26 call be changed to provide a higher melt index such that first strands 26 can more easily penetrate and bond with fabric layer 22 when subjected to the predetermined pressure and heat flux. Consequently, the same level of integral bonding can be achieved without changing the processing conditions despite the increased density of first fabric layer 22.

Based upon the foregoing, it is believed that first strands 26 should preferably be aligned so as to provide a strand density of between about 2 and about 10 strands per centimeter in conjunction with a strand cross-sectional area of between about 0.0005 and about 0.03 cm$^2$ so that merger or overlap of integrally bonded first strands 27 in laminate structure 20 can be avoided. More preferably, first stands 26 have a strand density of between about 3 and about 6 in conjunction with a strand cross-sectional area of between about 0.001 and about 0.005 cm$^2$. A melt index of between about 2 and about 15 (as measured per ASTM D1238) in conjunction with the above-described stand density and strand cross-sectional area values has been found to be satisfactory.

With regard to second strands 28, it is believed that the strand density, strand cross-sectional area, and the modulus of second strands 28 can also can affect the elastic properties of laminate structure 20 (e.g., the modulus of structure 20) in the direction along the second strands (i.e., along direction D of FIG. 2). For example, as the strand density and/or the strand cross-sectional area of second strands 28 increases, the modulus of laminate structure 20 will decrease. For a laminate structure of the present invention to be incorporated into a product to be worn about the body, it is desirable that a modulus of between about 100 grams force per cm and about 250 grams force per cm at a unit strain $\epsilon_u$ of about 1 be provided. It is believed that providing second strands 28 having a strand density of between about 2 and about 5, a cross-sectional area of between about 0.003 cm$^2$ and about 0.02 cm$^2$, and comprising a styrene butadiene block copolymer will provide a laminate structure having the preferred modulus in a direction along second strands 28. The modulus of laminate structure 20 can be measured by techniques known in the art. For example, the modulus of laminate structure 20 can be measured using a universal constant rate of elongation tensile tester, such as Instron Model #1122 (which was manufactured by Instron Engineering Corporation of Canton, Mass.).

Laminate structure 20 can also be subjected to various additional post-formation processes known in the art. For example, a laminate structure made in accordance herewith can comprise additional fabric layers which are joined to the laminate structure so as to further improve the wearability and comfort of the structure. The additional fabric layers can be secured to the laminate structure by a uniform continuous layer of adhesive, a patterned layer of adhesive, or an array of separate lines, spirals, or spots of adhesive. An adhesive found to be satisfactory is manufactured by Findlay Adhesives of Wauwatosa, Wis. and marketed under the name H2031. Alternatively, the additional fabric layers can be attached by heat bonds, pressure bonds, ultrasonic bonds, dynamic mechanical bonds or any other suitable method as are known in the art.

Having shown and described the preferred embodiments of the present invention, further adaptation of the improved laminate structure can be accomplished by appropriate modifications by one of ordinary skill in the art without departing from the scope of the present invention. A number of alternatives and modifications have been described herein and others will be apparent to those skilled in the art. For example, broad ranges for the physically measurable parameters have been disclosed for the inventive laminate structure as preferred embodiments of the present invention, yet it is contemplated that the physical parameters of the laminate structure can be varied to produce other preferred embodiments of improved laminate structure of the present invention as desired. In addition, it should be readily apparent that the alignment, properties, and composition of first strands 26 can be interchanged with those of second strands 28, or additional strands can be provided (e.g., a plurality of third strands etc.) to alter or enhance the properties of a laminate structure made in accordance with this invention. Accordingly, the scope of the present invention should be considered in terms of the following claims and is understood not to be limited to the details of the structures and methods shown and described in the specification and drawings.

What is claimed is:

1. A laminate structure comprising:
   a first fabric layer; and
   a mesh having a plurality of first strands intersecting a plurality of second strands, said first and second strands having a softening temperature at a bonding pressure, at least one of said first strands being integrally bonded to said first fabric layer by application of said bonding pressure at said softening temperature.

2. The laminate structure of claim 1, wherein the softening temperatures of said first and second strands are distinct at said bonding pressure, the softening temperature of said first strands being less than the softening temperature of said second strands.

3. The laminate structure of claim 1, wherein at least one of said first strands is substantially flat in shape.

4. The laminate structure of claim 1, wherein said fabric layer has a fabric inner surface and at least one of said first strands is substantially coplanar with said fabric inner surface.

5. The laminate structure of claim 1, wherein said mesh comprises between about 2 and about 10 first strands per centimeter.

6. The laminate structure of claim 1, wherein at least one of said first strands has a cross-sectional area of between about 0.0005 cm$^2$ and about 0.03 cm$^2$.

7. The laminate structure of claim 1, said first strands having a strand coverage of about 50 percent.

8. The laminate structure of claim 1, wherein corresponding first strands and second strands intersect at a predetermined and substantially uniform angle.

9. The laminate structure of claim 8, wherein said angle of intersection is about 90 degrees.

10. The laminate structure of claim 1, wherein said at least one of said first strands of said mesh is inelastic.

11. The laminate structure of claim 1, wherein at least one of said second strands of said mesh is elastic.

12. The laminate structure of claim 1, further comprising a structure first direction and a structure second direction, said laminate structure being inelastic in said structure first direction and elastic in said structure second direction.

13. The laminate structure of claim 1, wherein at least one of said second strands has a substantially elliptical cross-sectional shape.

14. A laminate structure comprising:
    a first fabric layer having a fabric inner surface;
    a mesh having a plurality of polymeric first strands intersecting a plurality of polymeric second strands, said first strands being inelastic and said second strands being elastic, said first and second strands having distinct softening temperatures at a bonding pressure, the softening temperature of said first strands being less than the softening temperature of said second stands at said bonding pressure, said mesh having a strand density of between about 2 and about 10 first strands per centimeter, at least one of said first strands having a strand cross-sectional area between about 0.0005 cm$^2$ and about 0.03 cm$^2$, at least one of said first strands being integrally bonded to said first fabric layer, and at least one of said first strands being substantially flat in shape.

15. A method for forming a laminate structure comprising the steps of:
    providing a first fabric layer having a fabric inner surface;
    providing a mesh having a plurality of first strands intersecting a plurality of second strands, said first and second strands having a first softening temperature at a bonding pressure;
    heating said mesh to the first softening temperature of said first strands;
    applying said bonding pressure to said first strands; and
    integrally bonding at least one of said first strands to said first fabric layer.

16. The method of claim 15, wherein said first fabric layer is provided with a fabric inner surface and the step of applying said bonding pressure deforms said first strands into a conformation which is substantially coplanar with said fabric inner surface.

17. The method of claim 15, further comprising the step of providing a first surface and a second surface for applying said bonding pressure, said first surface being substantially resilient and said second surface being substantially non-resilient.

18. The method of claim 17, wherein said first and second surfaces are provided in a form comprising at least one substantially flat plate.

19. The method of claim 18, wherein said first and second surfaces are provided in a form comprising at least one roller.

20. The method of claim 15, further comprising the step of applying a deformation pressure to said second strands to deform said second strands into a substantially elliptical cross-sectional shape.

21. The laminate structure according to claim 1 further comprising one or more additional fabric layers.

22. The laminate structure according to claim 21 wherein one of said additional fabric layers is integrally bonded to said laminate on the side of said mesh opposite said first fabric layer.

* * * * *